Patented Apr. 27, 1943

2,317,364

UNITED STATES PATENT OFFICE 2,317,364

COMPOSITE STRUCTURE COMPRISING SYNTHETIC RESIN, AND METHOD FOR MAKING SAME

Norman Adrian de Bruyne and Claude Albert Abbs Rayner, Duxford, England, assignors, by mesne assignments, to Aero Research Limited, Duxford, England, a company of Great Britain No Drawing. Application October 9, 1940, Serial No. 360,512. In Great Britain October 13, 1939

13 Claims. (Cl. 154—2)

This invention relates to an adhesive or cementing composition for synthetic resins and it has for an object to provide an adhesive which is capable of cementing elements or component parts comprising fully cured synthetic resins including phenol-formaldehyde, cresol-formaldehyde, urea-formaldehyde, aniline-formaldehyde, melamine-formaldehyde and mixtures thereof, to elements or component parts of the same or of a different composition, such as wood.

It is a further object of the invention to provide an adhesive or cementing composition which is capable of forming joints between component parts of the above mentioned fully cured resins, which joints are as strong and as heat resisting as the united material itself.

It is another object of the invention to provide an adhesive composition which may be used for example in building up the framework of aircraft and for attaching the "skin" to such framework.

It is a further object of the invention to provide an adhesive or cementing composition which is capable of uniting the above mentioned fully cured resins at a relatively low temperature, for example 140° C., to form joints which only soften at relatively high temperatures, e. g., above 210° C., if at all.

It is a still further object of the invention to provide an adhesive composition comprising two substances one of which is capable of acting, under pressure, at a temperature below its softening point, on the above-mentioned fully cured synthetic resins, while the other substance is capable of hardening under the same conditions of temperature and pressure.

Hitherto, it has not been found possible to make good joints by adhesion between component parts comprising the above mentioned resins after they have reached their final fully cured state. Attempts have been made by abrading the surface of such materials to obtain a mechanical key for an adhesive or, alternatively, by abrasion or chemical action to expose reinforcing material within the resin material so as to allow the adhesive to form a joint with the said reinforcement. In the aircraft industry numerous small rivets are employed in the building up of the framework of wings and the like from component parts of synthetic resin laminated material.

It has been found that by incorporating a heat-hardenable phenol-formaldehyde condensation product with an aromatic amine formaldehyde condensation product, preferably an aniline formaldehyde condensation syrup, an adhesive composition is obtained which is capable of uniting with the above mentioned fully cured synthetic resins at a temperature below the softening point of the aromatic amine formaldehyde, but which when hardened only softens at temperatures considerably above the softening point of the said amine formaldehyde product. It has further been found that an aniline formaldehyde condensation product having a high softening point is particularly suitable as the aromatic amine formaldehyde.

Thus according to the invention an adhesive composition comprises a mixture of an aromatic amine formaldehyde condensation product and a phenol-formaldehyde condensation product. Preferably the phenol-formaldehyde condensation product is a heat-hardenable resin formed by condensing one molecule of phenol with two molecules of formaldehyde, and the aromatic amine formaldehyde condensation product is an aniline-formaldehyde condensation product of high softening point obtained by reacting one molecule of aniline with from 1 to 1.5 molecules of formaldehyde. The proportion of the aniline formaldehyde to the phenol-formaldehyde in the adhesive composition may be widely varied but preferably an adhesive composition according to the invention comprises from 1 to 2 parts by weight of aniline formaldehyde resin and from 2 to 1 parts by weight of a condensation syrup of phenol-formaldehyde containing about 50% resin.

Further according to the invention, a method of joining together two surfaces at least one of which comprises a fully cured formaldehyde resin such as urea-formaldehyde or phenol-formaldehyde consists in coating at least one of said surfaces with an adhesive mixture of an aromatic amine formaldehyde condensation product, such as aniline-formaldehyde and an initial phenol-formaldehyde condensation product, applying the coated surface to the second surface and hardening the adhesive mixture under pressure at a temperature below that at which the amine formaldehyde product normally softens.

The uncured or partially cured phenol-formaldehyde may be incorporated within the amine formaldehyde in the form of a solution of its initial condensation products in water or alcohol or other volatile solvent, or as a powder or in the form of a film glue, e. g., impregnated fabric or paper.

The aniline formaldehyde resin may be prepared from:

100 parts by weight of aniline (1.08 mol)
35 parts by weight of hydrochloric acid or 117 parts by weight of 30% hydrochloric acid solution (0.96 mol)
1000 parts by weight of water, and
117 parts by weight of formalin, i. e., 40% formaldehyde in water (1.56 mol).

Preferably the proportion of hydrochloric acid per molecule of aniline is from 0.8 to 1 molecule but these limits may be varied. It is found that when the proportion of hydrochloric acid is less than 0.8 molecule, a white sticky substance which is probably an azo-methin resin is deposited when the formalin is added. On the other hand, if the proportion of hydrochloric acid is increased above one molecule, the stability of the solution is reduced and an orange substance is finally precipitated. Instead of aniline and hydrochloric acid an equivalent amount of aniline hydrochloride may be used. The proportion of formaldehyde per molecule of aniline may be varied from about 1.2 to 1.5 molecules, while the extent of dilution with water may be varied within wide limits depending on the removal of the heat generated by the reaction.

In the preparation of the aniline-formaldehyde resin, the aniline and hydrochloric acid are first mixed together and the water added. The initial temperature for starting the reaction is about 25 to 29° C. and should not be below this range. The formaldehyde is added fairly slowly with constant stirring, further cold water being added if necessary to prevent the temperature from rising above 40° C. due to the exothermic reaction. The dilution of the reaction mixture is arranged so that the temperature is kept within the above limits. Where most of the heat generated is readily conducted away, the dilution may be reduced to about 400 parts by weight of water. In large scale operations however the heat conduction is not so efficient and higher dilutions may be necessary to reduce the velocity of the reaction. Such dilutions however should not exceed 3,000 parts by weight of water to 100 parts by weight of aniline.

The resultant solution which is formed is red and is preferably allowed to stand for about an hour. Alkali, such as caustic potash, is then added until a pH value of about 8, i. e., a slightly alkaline solution, is obtained, when the resin is precipitated. Preferably, the alkali is added with repeated stirring in order to produce as small a particle size as possible. The precipitated resin is filtered and washed with a large amount of water until all salts are removed. It is then dried at a temperature of about, but not exceeding, 80° C. and ground in a ball mill after which it is ready for incorporation with the phenol-formaldehyde resin.

An adhesive or cementing composition according to the present invention may be made by stirring 15 grams of the aniline-formaldehyde resin in the form of a fine powder into 17.5 grams of a solution in water, methylated spirit or other organic solvent, of the initial condensation products of phenol and formaldehyde containing about 55 parts by weight of resin. The resultant paste to which a small quantity of wetting agent, for example, 0.1 to 0.3% of ammonium sulpho-ricinoleate calculated on the weight of the mixed aniline-formaldehyde and phenol-formaldehyde, may be added to assist spreading.

After the adhesive has been applied to one of the two surfaces to be united, the surfaces are brought into contact and the temperature is raised to about 140° C. under a pressure of about 200 lbs. per square inch until the adhesive has set or hardened. The time required for setting may be about 8 minutes, but is largely governed by the speed of setting of the phenol-formaldehyde resin. This should not be too fast as otherwise insufficient time is given for the aniline-formaldehyde to attack the surface.

Instead of the above mentioned wetting agent, other wetting agents such as are used in the textile industry may be used.

Joints made as above by means of an adhesive comprising an aniline formaldehyde resin mixed with a phenol-formaldehyde resin can thus be made at a temperature well below the softening point of the aniline formaldehyde product and the resulting joint can only be softened at a very high temperature, if at all. When tested according to the method described in British Standard Specification 3V2, in which a bending force as well as a shear force is introduced, it is found that joint strengths in excess of 1500 lbs. per square inch are obtained.

When joining large surfaces it is advantageous to mix the aniline-formaldehyde resin with uncured phenol-formaldehyde resin dissolved in acetone and to apply the mixture to one or both of the surfaces to be joined and then allow it to dry, the joint being made under heat and pressure in the usual way. This method tends to prevent steam from being trapped in the joint and thus forming non-adherent patches.

A convenient way of applying the cement to the parts to be united consists in extruding the adhesive from a nozzle suitably dimensioned to deposit a thin uniform film of adhesive over the surface or surfaces. After coating at least one of the surfaces to be united, the parts are held together in a press at an elevated temperature as above described.

It will be understood that an adhesive composition according to the invention may be used for cementing synthetic resins whether fully or only partially cured or hardened, and whether pure or impregnated with fillers such as wood flour or slate dust, or incorporating reinforcements such as asbestos or textiles. The expression formaldehyde condensation product as used in the following claims is intended to embrace condensation products of formaldehyde with phenols, ureas, aniline and melamine.

What we claim is:

1. A method of joining together two surfaces at least one of which comprises a hardened formaldehyde condensation product, said method comprising coating at least one of the said surfaces with an adhesive mixture comprising an aniline-formaldehyde condensation product and an initial phenol-formaldehyde condensation product, applying the coated surface to the second surface, and hardening the adhesive mixture at a temperature of about 140° C. under a pressure of about 200 lbs. per square inch.

2. Method of joining surfaces, at least one of which comprises a hardened formaldehyde condensation product, that comprises coating at least one of the surfaces with a mixture of aniline-formaldehyde condensation product and an initial phenol-aldehyde condensation product, said mixture being capable of reacting under heat and pressure at least superficially with said hardened formaldehyde condensation product, placing the surfaces in contact, and hardening the mixture under heat and pressure.

3. Method of joining surfaces, at least one of which comprises a hardened formaldehyde condensation product, that comprises coating at least one of the surfaces with a mixture of aniline-formaldehyde condensation product and an initial phenol-aldehyde condensation product, said mixture being capable of reacting under heat and pressure at least superficially with said hardened formaldehyde condensation product, placing the surfaces in contact, and hardening the mixture under pressure at a temperature below the softening point of the aniline-formaldehyde condensation product.

4. Method of joining surfaces, at least one of which comprises a hardened formaldehyde condensation product, that comprises coating at least one of the surfaces with a mixture of aniline-formaldehyde condensation product and an initial phenol-aldehyde condensation product, said mixture being capable of reacting under heat and pressure at least superficially with said hardened formaldehyde condensation product, placing the surfaces in contact, and hardening the mixture under a pressure of about 200 pounds per square inch and at a temperature below the softening point of the aniline-formaldehyde condensation product.

5. Method of joining surfaces, at least one of which comprises a hardened formaldehyde condensation product, that comprises coating at least one of the surfaces with a mixture of a wetting agent, aniline-formaldehyde condensation product and an initial phenol-aldehyde condensation product, said mixture being capable of reacting under heat and pressure at least superficially with said hardened formaldehyde condensation product, placing the surfaces in contact, and hardening the mixture under heat and pressure.

6. As an article of manufacture, a composite structure comprising a body of hardened formaldehyde condensation product and another body adhesively united thereto by a hardened mixture of aniline-formaldehyde and phenol-formaldehyde condensation products.

7. As an article of manufacture, a composite structure comprising a body of hardened formaldehyde condensation product and another body adhesively united thereto by a hardened mixture of approximately 15 parts by weight aniline-formaldehyde condensation product and about 9.5 parts by weight phenol-formaldehyde condensation product.

8. A method of joining the surface of a hardened synthetic resin to another surface, which comprises applying to at least one of the surfaces to be united an adhesive mixture comprising an aromatic amine-formaldehyde condensation product and a heat-hardenable phenol-formaldehyde condensation product, said adhesive mixture being capable of reacting under heat and pressure at least superficially with said hardened synthetic resin, placing the surfaces in contact, and hardening the adhesive mixture under heat and pressure.

9. A method of joining surfaces as defined in claim 2, in which the aniline-formaldehyde condensation product is one having a high softening point.

10. A method of joining surfaces as defined in claim 2, in which the aniline-formaldehyde condensation product is obtained by mixing aniline with hydrochloric acid, adding formaldehyde, and precipitating the resinous condensation product with alkali.

11. A method of joining surfaces as defined in claim 2, in which the aniline-formaldehyde condensation product is obtained by mixing aniline with hydrochloric acid in the ratio of approximately 0.8 to 1.0 mol of hydrochloric acid per mol of aniline, adding formaldehyde in the ratio of approximately 1.2 to 1.5 mols of formaldehyde per mol of aniline, and precipitating the resinous condensation product with alkali.

12. A method of joining surfaces as defined in claim 5, in which 0.1 to 0.3% of ammonium sulpho-ricinoleate, based upon the weight of the mixed aniline-formaldehyde and initial phenol-formaldehyde condensation products, is employed as the wetting agent.

13. As an article of manufacture, a composite structure comprising a body of hardened synthetic resin and another body adhesively united thereto by means of a hardened adhesive mixture comprising an aromatic amine-formaldehyde condensation product and a heat-hardenable phenol-formaldehyde condensation product.

NORMAN ADRIAN DE BRUYNE.
CLAUDE ALBERT ABBS RAYNER.

CERTIFICATE OF CORRECTION.

Patent No. 2,317,364. April 27, 1943.

NORMAN ADRIAN de BRUYNE, ET AL.

It is hereby certified that error appears in the printed specification of the above numbered patent requiring correction as follows: Page 1, second column, line 42, for the word "within" read --with--; and that the said Letters Patent should be read with this correction therein that the same may conform to the record of the case in the Patent Office.

Signed and sealed this 1st day of June, A. D. 1943.

(Seal)

Henry Van Arsdale,
Acting Commissioner of Patents.